(12) United States Patent
Zhang

(10) Patent No.: US 8,780,724 B2
(45) Date of Patent: Jul. 15, 2014

(54) METHOD, NODE DEVICE, AND COMMUNICATION SYSTEM FOR DEVICE POOL MANAGEMENT

(75) Inventor: Ping Zhang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 478 days.

(21) Appl. No.: 13/095,717

(22) Filed: Apr. 27, 2011

(65) Prior Publication Data

US 2011/0205900 A1    Aug. 25, 2011

Related U.S. Application Data

(63) Continuation of application No. PCT/CN2009/073185, filed on Aug. 11, 2009.

(30) Foreign Application Priority Data

Oct. 27, 2008    (CN) .......................... 2008 1 0171221

(51) Int. Cl.
*G01R 31/08* (2006.01)
*H04L 12/56* (2006.01)

(52) U.S. Cl.
CPC .................................... *H04L 47/10* (2013.01)
USPC ......................................................... 370/237

(58) Field of Classification Search
CPC ...................................................... H04L 47/10
USPC ......................................... 370/216–228, 237
See application file for complete search history.

(56) References Cited

U.S. PATENT DOCUMENTS

| | | | |
|---|---|---|---|
| 2005/0007954 A1* | 1/2005 | Sreemanthula et al. ....... | 370/229 |
| 2005/0152269 A1* | 7/2005 | Liu ............................... | 370/225 |
| 2006/0067210 A1* | 3/2006 | Liu et al. ....................... | 370/217 |
| 2006/0159076 A1* | 7/2006 | Bless et al. .................... | 370/356 |
| 2006/0165009 A1* | 7/2006 | Nguyen et al. ................. | 370/252 |
| 2007/0070883 A1* | 3/2007 | Lysne et al. ................... | 370/218 |
| 2007/0091796 A1* | 4/2007 | Filsfils et al. ................. | 370/228 |
| 2007/0162616 A1 | 7/2007 | Li | |

FOREIGN PATENT DOCUMENTS

| | | |
|---|---|---|
| CN | 1859180 A | 11/2006 |
| CN | 1863218 A | 11/2006 |
| CN | 1882152 A | 12/2006 |

(Continued)

OTHER PUBLICATIONS

Translation of Office Action dated Mar. 23, 2011 in connection with Chinese Patent Application No. 200810171221.X.

(Continued)

*Primary Examiner* — Phuongchau B Nguyen

(57) ABSTRACT

A method, a node device, and a communication system for device pool management are disclosed. The method includes: obtaining autonomous loop configuration data which describes relations between a node device and its ancestor node device and between the node device and its descendant node device in an autonomous loop by using identifiers of node devices in the autonomous loop; and setting up a backup relation between a node device and an ancestor node device as well as a backup relation between the node device and a descendant node device according to the autonomous loop configuration data, receiving and storing backup data sent by the ancestor node device, and sending data of the node device to be backed up to the descendant node device. Therefore, the service continuity is ensured when some of the node devices disengage from the autonomous loop.

18 Claims, 10 Drawing Sheets

(56) References Cited

FOREIGN PATENT DOCUMENTS

| CN | 101102250 A | 1/2008 |
|---|---|---|
| CN | 101132326 A | 2/2008 |
| CN | 101179815 A | 5/2008 |
| CN | 101183984 A | 5/2008 |

OTHER PUBLICATIONS

Written Opinion of the International Searching Authority dated Nov. 26, 2009 in connection with International Patent Application No. PCT/CN2009/073185.

Partial translation of Rejection Decision dated Jan. 6, 2012 in connection with Chinese Patent Application No. 200810171221.X.

Zheng Zhang, et al., "P2P Resource Pool and Its Application to Optimize Wide-Area Application Level Multicasting", Proceedings of the 2004 International Conference on Parallel Processing Workshops (ICPPW'04), 2004, 9 pages.

International Search Report dated Nov. 26, 2009 in connection with International Patent Application No. PCT/CN2009/073185.

Yuh-Shyan Chen, et al., "RAA: a ring-based address autoconfiguration protocol in mobile ad hoc networks", Wireless Pers Commun. (2007), Apr. 20, 2007, p. 549-571.

\* cited by examiner

METHOD, NODE DEVICE, AND COMMUNICATION SYSTEM FOR DEVICE POOL MANAGEMENT

CROSS-REFERENCE TO RELATED APPLICATIONS

This application is a continuation of International Application No. PCT/CN2009/073185, filed on Aug. 11, 2009, which claims priority to Chinese Patent Application No. 200810171221.X, filed on Oct. 27, 2008, both of which are hereby incorporated by reference in their entireties.

TECHNICAL FIELD

The present invention relates to communication technologies, and in particular, to a method, a node device, and a communication system for device pool management.

BACKGROUND

A pool management mechanism is introduced in the core network to implement load sharing between network elements and disaster recovery, reducing service interruption and improving reliability of the core network. However, the pool management mechanism in the prior art provides no peer interfaces between members. Therefore, important operations such as synchronization, backup and handover are not practicable between members, and the pool is unable to ensure continuity of online services when the pool fails.

In the prior art, the 3rd Generation Partnership Project (3GPP) puts forward a "pool area" concept. A pool area includes all Location Areas (LAs) or Routing Areas (RAs) which are located in a Radio Access Network (RAN) and served by a group of core network nodes. In a pool area, multiple core network nodes run concurrently, and they share services in the pool area. When a Mobile Station (MS) is covered by radio resources of a pool area, the UE is served by only one dedicated core network node in the pool area. When an MS roams in a pool area, it is not necessary to change the core network node that serves the MS, which reduces the update, handover, and migration between the core network nodes. All RAN nodes in a pool area are fully connected with all core network nodes in the pool area. Another benefit brought by a pool area that includes multiple core network nodes is: When one more core network node is added to the pool area, the pool area is better served by the core network nodes. That is, when a core network node fails, other core network nodes may provide services instead. A pool area may include diverse core network nodes, for example, Mobile Switching Center (MSC) pool, Serving General Packet Radio Service Supporting Node (SGSN) pool, and so on. FIG. 1 shows a schematic diagram of an MSC pool.

In the process of researching and practicing the prior art, the inventor of the present invention finds at least the following defect in the prior art:

In the foregoing pool management mechanism, when one node in the pool area fails, all the service contexts stored on the faulty node are lost, which reduces the network reliability.

SUMMARY

The embodiments of the present invention provide a method, a node device, and a communication system for device pool management to prevent loss of service data on a node device and improve network reliability.

The technical solution under the present invention is as follows:

A device pool management method provided in an embodiment of the present invention includes:

obtaining autonomous loop configuration data which describes relations between a node device and its ancestor node device and between the node device and its descendant node device in an autonomous loop by using identifiers of node devices in the autonomous loop; and setting up a backup relation between a node device and an ancestor node device as well as a backup relation between the node device and a descendant node device according to the autonomous loop configuration data, receiving and storing backup data sent by the ancestor node device, and sending data of the node device to be backed up to the descendant node device.

A node device provided in another embodiment of the present invention includes:

an obtaining unit, configured to obtain autonomous loop configuration data which describes relations between a node device and its ancestor node device and between the node device and its descendant node device in an autonomous loop by using identifiers of node devices in the autonomous loop;

a backup unit, configured to set up a backup relation between the node device and an ancestor node device as well as a backup relation between the node device and a descendant node device according to the autonomous loop configuration data obtained by the obtaining unit, and receive and store backup data sent by the ancestor node device; and a first sending unit, configured to send data of the node device to be backed up to a descendant node device according to the autonomous loop configuration data obtained by the obtaining unit.

A communication system provided in another embodiment of the present invention includes a network management unit and an autonomous loop including a plurality of node devices. Each node device has an identifier in the autonomous loop.

The network management unit is configured to send autonomous loop configuration data to each node device, where the autonomous loop configuration data describes relations between a node device and its ancestor node device and between the node device and its descendant node device in an autonomous loop by using identifiers of node devices in the autonomous loop.

The node device is configured to: obtain the autonomous loop configuration data which describes relations between a node device and its ancestor node device and between the node device and its descendant node device in the autonomous loop by using identifiers of node devices in the autonomous loop; set up a backup relation between the node device and the ancestor node device as well as a backup relation between the node device and the descendant node device according to the autonomous loop configuration data, receive and store backup data sent by the ancestor node device, and send data of itself to be backed up to the descendant node device.

The foregoing technical solution discloses that: In an autonomous loop, backup relations are set up between a node device and an ancestor node device, and between the node device and a descendant node device, and therefore, when some node devices in the autonomous loop abort the service, other node devices may take over online services in real time, ensuring continuity of the services and improving network reliability.

BRIEF DESCRIPTION OF THE DRAWINGS

To make the technical solution under the present invention or in the prior art clearer, the following briefly describes the accompanying drawings involved in the description of the embodiments of the present invention or the prior art. Apparently, the accompanying drawings below are illustrative rather than exhaustive, and persons of ordinary skill in the art may derive other drawings from such accompanying drawings without any creative effort.

DETAILED DESCRIPTION

The following detailed description is given in conjunction with the accompanying drawings in order to provide a thorough understanding of the present invention. Apparently, the drawings and the detailed description are merely representative of particular embodiments of the present invention, and the embodiments are illustrative in nature rather than exhaustive. All other embodiments, which can be derived by those skilled in the art from the embodiments given herein without any creative effort, shall fall within the scope of the present invention.

The embodiments of the present invention provide a method, a node device, and a communication system for device pool management. Each node device is concatenated with an ancestor node device and a descendant node device and forms a relation with the ancestor node device and the descendant node device, forming a Pool-style autonomous loop. Any node device in the autonomous loop stores backup of the data required by an ancestor node device of the node device, stores the load state information of an ancestor node device and a descendant node device, sends the data to be backed up to a descendant node device, and sends the load state information of the node device to a ancestor node device and a descendant node device. To make the technical solution clearer, the following expounds the present invention with reference to exemplary embodiments.

Embodiment 1

Figure 1:
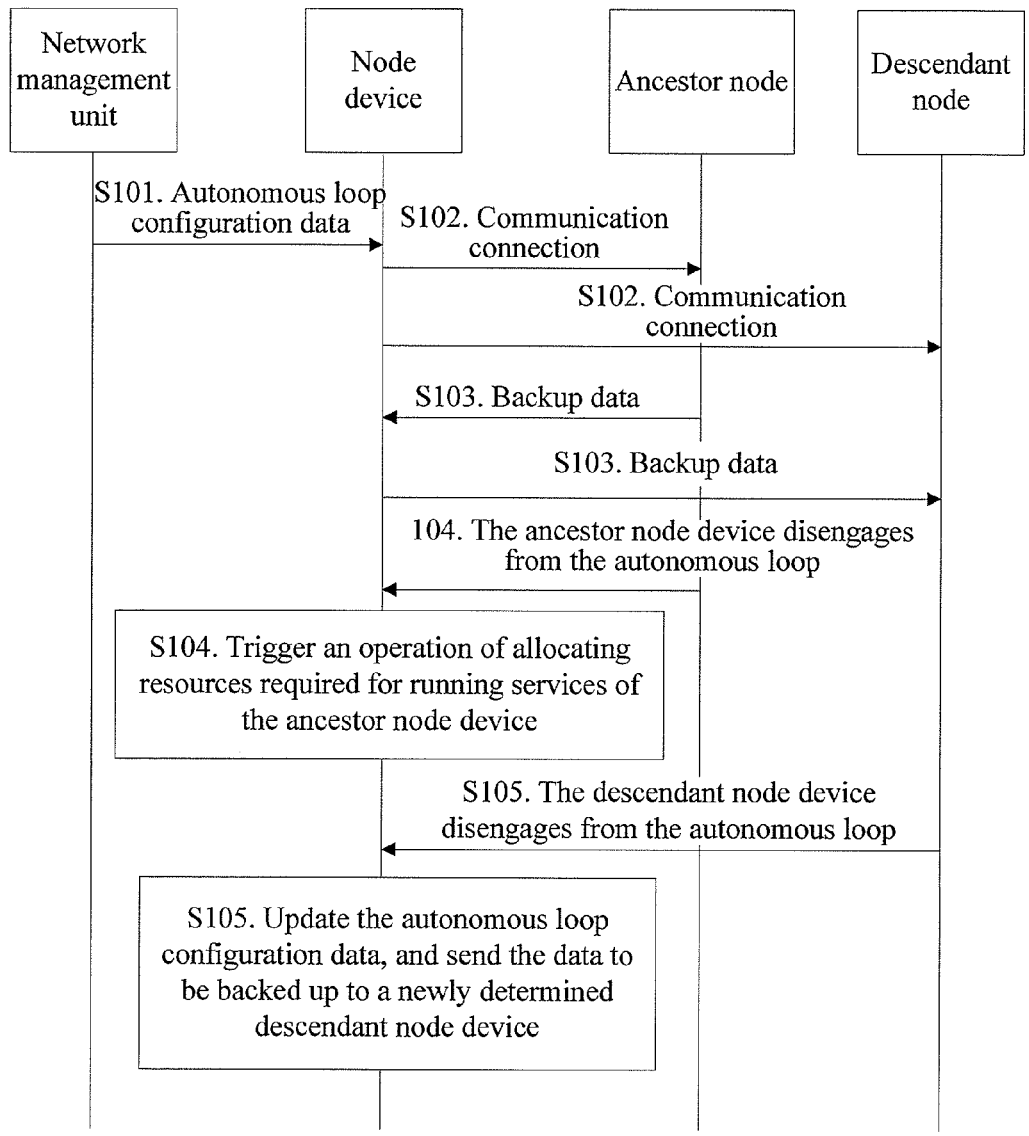
FIG. 1 is a flow chart of a device pool management method provided in Embodiment 1 of the present invention.

FIG. 1 is a flow chart of a device pool management method provided in Embodiment 1 of the present invention. The method includes the following steps:

S101: Obtain autonomous loop configuration data from a network management unit (such as network server), where the autonomous loop configuration data describes relations between a node device and its ancestor node device and between the node device and its descendant node device in an autonomous loop by using identifiers of node devices in the autonomous loop.

S102: Set up a backup relation between each node device and its ancestor node device, and a backup relation between each node device and its descendant node device according to the autonomous loop configuration data. Specifically, obtain the IP address of the ancestor node device and the IP address of the descendant node device according to the autonomous loop configuration data; set up a control channel between the node device and the ancestor node device, or a control channel between the node device and the descendant node device through a Point-to-Point (P2P) interface; and set up a service channel between the node device and the ancestor node device, and a service channel between the node device and the descendant node device through the control channel. Transmit the control signaling through the control channel, and transmit the service-related data such as backup data and load state information through the service channel.

S103: Receive and store the backup data sent by the ancestor node device, and send the data of the node device to be backed up to the descendant node device. The data to be backed up includes user information, connection information of upstream and downstream service nodes, or service bearer contexts.

In this embodiment, the method may further include the following steps:

S104: When the ancestor node device disengages from the autonomous loop, update the autonomous loop configuration data, and trigger an operation of allocating resources required for running services of the ancestor node device according to the backup data sent by the ancestor node device, taking over the services of the ancestor node device and preventing service interruption of the ancestor node device.

S105: When the descendant node device disengages from the autonomous loop, update the autonomous loop configuration data, and send the data of the node device to be backed up to a newly determined descendant node device.

The identifier of each node device is unique in the autonomous loop.

Figure 2:
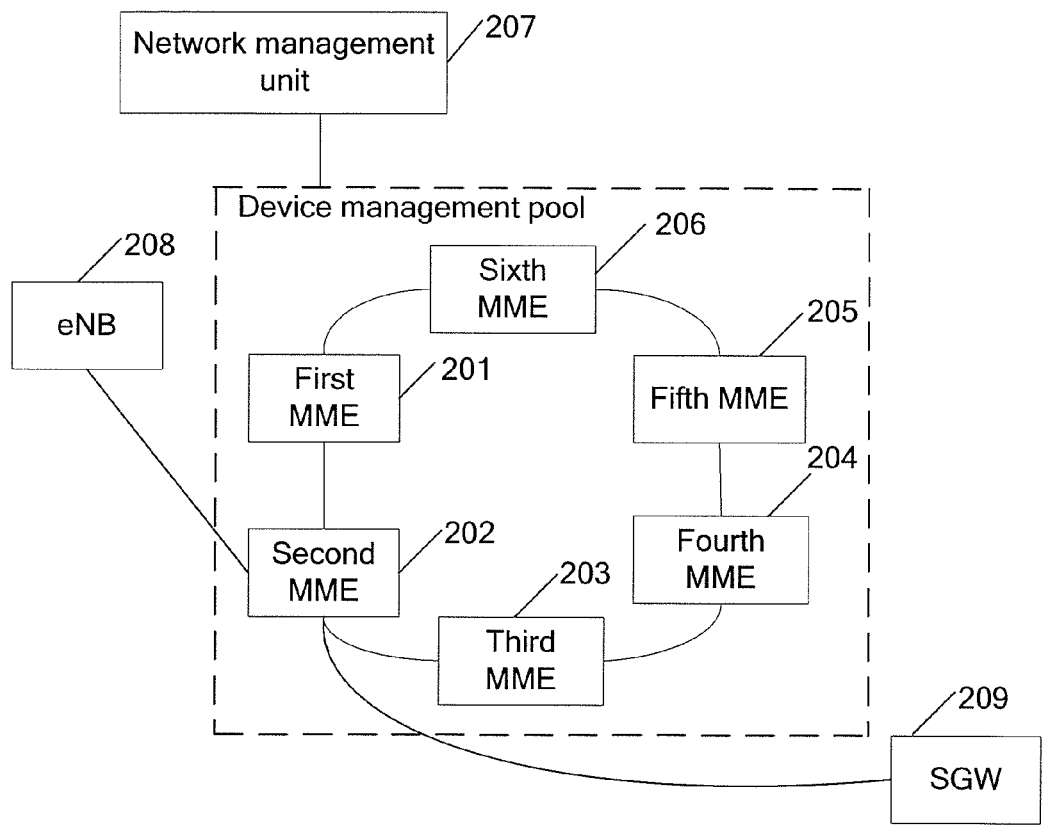
FIG. 2 is a schematic diagram of the first example in Embodiment 1 of the present invention.

The following describes Embodiment 1 using an example with reference to FIG. 2:

A second Mobility Management Entity (MME) 202 obtains the autonomous loop configuration data from the network management unit 207. The configuration data indicates that an ancestor node device is a first MME 201 and a descendant node device is a third MME 203, and indicates the IP addresses of the first MME 201 and the third MME 203. The second MME 202 sets up a pool-P2P communication connection to the ancestor node device according to the IP address of the ancestor node device. Specifically, the second MME 202 sends a pool-P2P interface message such as P2P_Connect_Req to the first MME 201 according to the IP address of the ancestor node device. The pool-P2P interface message carries the following information: (1) connection type which is the same as that of the descendant node device; (2) control channel identifier allocated by the second MME 202 to the pool-P2P communication connection; and (3) data channel identifier allocated by the second MME 202 to the pool-P2P communication connection. Afterward, the first MME 201 returns a P2P_Connect_Rsp message to the second MME 202. The P2P_Connect_Rsp message carries the control channel identifier and the data channel identifier of the P2P connection allocated by the first MME 201. If the first MME 201 refuses to set up the P2P connection, the message carries a failure cause. In this instance, if a GPRS Tunneling Protocol (GTP) is applied between the MMEs, the control channel identifier and the data channel identifier are in the form of Tunnel Endpoint Identifier (TEID).

The second MME 202 sets up a pool-P2P communication connection to the descendant node device in the same way as setting the pool P2P communication connection to the ancestor node device. The second MME 202 receives the backup data from the MME 201 through the pool-P2P communication connection to the ancestor node device, and obtains management parameters of the autonomous loop. The management parameters of the autonomous loop include IP addresses of all node devices in the autonomous loop and the arrangement relation between the node devices: 201-202-203-204-205-206-201. Through the data channel set up by using the pool-P2P interface, the second MME 202 sends the service contexts (including mobility context and session context) active on the second MME 202 to the third MME 203 for backup. The message that carries the service contexts is Pool_Data_Backup, and the parameter 1 carried in the message is: "number of contexts to be backed up", and the parameter 2 carried in the message is "list of contexts to be backed up". Each context to be backed up in the list includes the parameter entries to be updated and the update mode (such as add, delete, and modify). The upstream service node of the second MME 202 is an evolved NodeB (eNB) 208, and the downstream service node of the second MME 202 is a Serving Gateway (SGW) 209.

When the first MME 201 disengages from the autonomous loop, the second MME 202 takes over the upstream and downstream services of the first MME 201 according to the backup data which is received by the second MME 202 from the first MME 201. According to the autonomous loop management parameters, the second MME 202 knows that the ancestor node device of the first MME 201 is a sixth MME 206. Therefore, the second MME 202 sets up a new ancestor relation with the sixth MME 206, and receives and stores the service contexts which are active on the sixth MME 206.

When the third MME 203 disengages from the autonomous loop, the second MME 202 stops sending service contexts to the third MME 203. According to the autonomous loop management parameters, the second MME 202 knows that the descendant node device of the third MME 203 is a fourth MME 204. Therefore, the second MME 202 sets up a P2P interface and a backup relation with the fourth MME 204, and sends service contexts to the fourth MME 204 through the P2P interface according to the backup relation, where the service contexts include the service contexts previously sent to the third MME 203.

In this embodiment, a backup relation is set up between a node device and the ancestor node device, and between the node device and the descendant node device in the autonomous loop. Therefore, when some node devices in the autonomous loop fail or abort the service, other node devices take over online services in real time. The takeover of the online services includes these steps: (1) The upstream and downstream service nodes detect a fault of the node device on the autonomous loop; (2) the upstream and downstream service nodes modify the service path, and send services destined for the faulty node device to a backup node device of the faulty node device; and (3) after receiving the services from the upstream and downstream service nodes, the backup node device activates the corresponding backup data, and processes the services in the same way of processing local services. In this way, the service continuity is ensured, and the network reliability is improved.

The following describes the method in this embodiment applied in different scenarios.

Scenario 1: A new node device joins the pool area.

Figure 3:
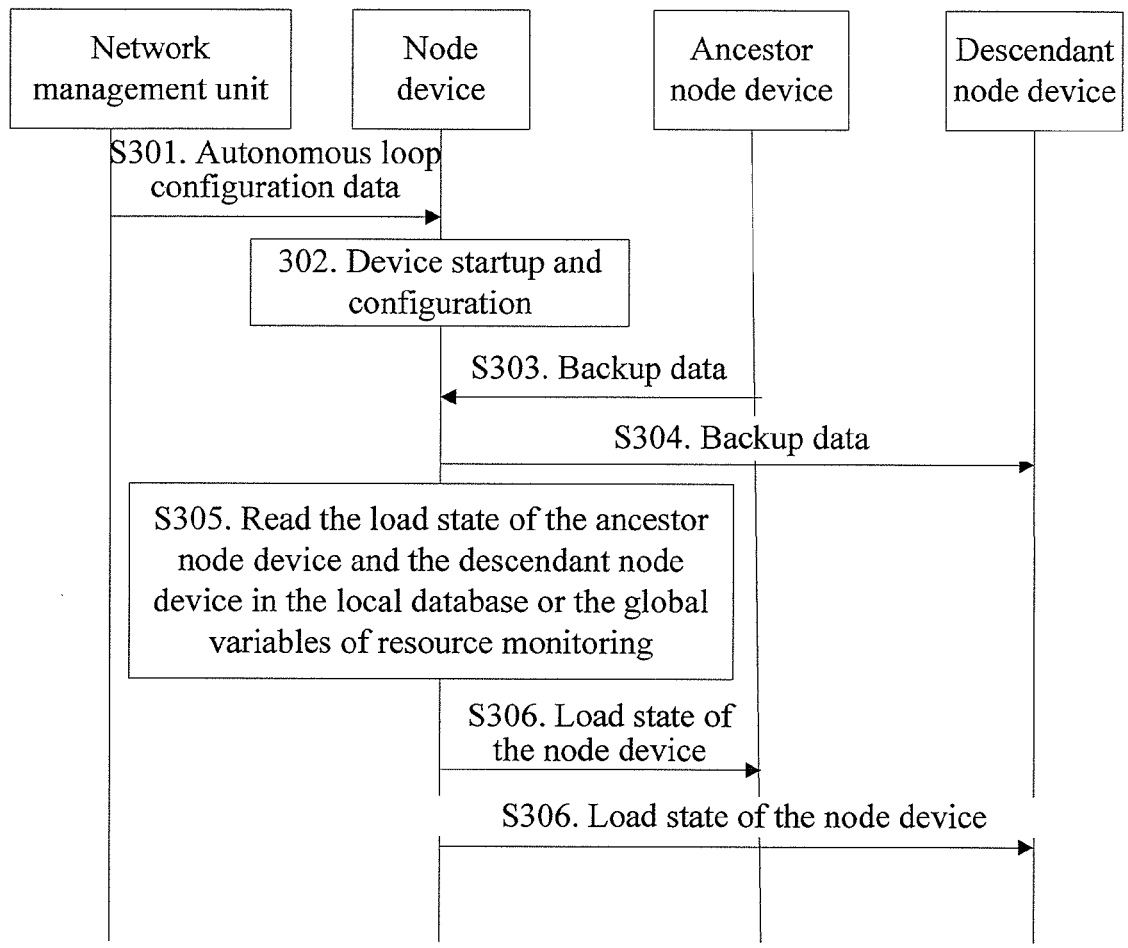
FIG. 3 is a flow chart of a device pool management method provided in Embodiment 2 of the present invention.

FIG. 3 is a flow chart of a device pool management method provided in Embodiment 2 of the present invention. The method includes the following steps:

S301: A node device in a Pool-style autonomous loop receives configuration data sent by a network management unit. The configuration data includes an identifier and a sequence number of the node device, for example, "identifier of the node device in the pool area=N6, and sequence number in the autonomous loop=(ancestor N5, descendant N1)".

S302: The node device in the Pool-style autonomous loop is started up and configured according to the configuration data received from the network management unit. The node device sends to the ancestor node device a pool_P2P connection request (P2P_Connect_Req) that carries parameter "connection type=descendant node device", and sends to the descendant node device a pool_P2P connection request (P2P_Connect_Req) that carries parameter "connection type=ancestor node device". For example, through a pool_P2P interface, N6 notifies N5 and N1 to modify the "descendant" and the "ancestor" to N6 respectively.

S303: The node device in the Pool-style autonomous loop receives and stores backup data sent by an ancestor node device. For example, N5 modifies "descendant" to N6 and then starts real-time backup so that important data is backed up to N6.

S304: The node device in the Pool-style autonomous loop sends data of itself to be backed up to a descendant node device. For example, N1 modifies "ancestor" to N6 and then stops receiving backup data from N5, but starts receiving backup data from N6.

S305: The node device in the Pool-style autonomous loop reads the load state of the ancestor node device and the descendant node device in the local database or the global variables of resource monitoring. Generally, the load state includes "CPU load" and "user quantity".

S306: Through the control channel of the pool_P2P interface, the node device sends a message to the ancestor node device and the descendant node device periodically, where the message carries a load state name "P2P_Load_Info" of the node device and parameters "load type" and "load state value".

In this scenario, when a new node device joins the pool area, two adjacent node devices of the new node device in the autonomous loop are affected, but no interference is caused to other node devices in the pool area in the operations such as setting up a pool_P2P interface, setting up a backup relation, and synchronizing data.

Scenario 2: load balance at the time of accessing a service.

Figure 4:
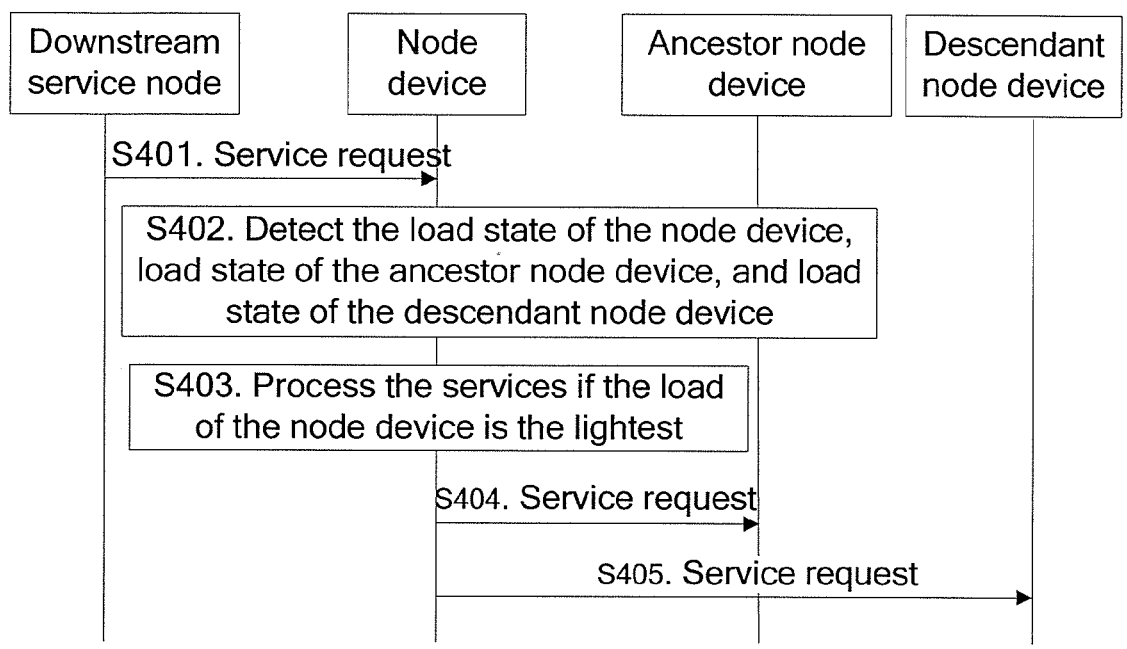
FIG. 4 is a flow chart of a device pool management method provided in Embodiment 3 of the present invention.

FIG. 4 is a flow chart of a device pool management method provided in Embodiment 3 of the present invention. The method includes the following steps:

S401: A node device in a Pool-style autonomous loop receives a service request from a downstream service node. For example, a node device N2 in a pool area receives a service request from a downstream service node A1, where N2 is a node device closest to A1 or a node device predetermined by the network management unit.

S402: The node device in the Pool-style autonomous loop detects the load state of itself, the load state of the ancestor node device, and the load state of the descendant node device.

S403: The node device in the Pool-style autonomous loop processes services together with the downstream service node if determining that the load of itself is the lightest.

S404: The node device in the Pool-style autonomous loop forwards the service request to the ancestor node device if determining that the load of the ancestor node device is the lightest.

S405: The node device in the Pool-style autonomous loop forwards the service request to the descendant node device if determining that the load of the descendant node device is the lightest.

For example, N2 detects the load state of itself, load state of the ancestor N1, and load state of the descendant N3, selects the lightest-loaded node device (such as N3), and forwards the service request to the lightest-loaded node device. After receiving the service request forwarded by N2, N3 detects the load state of itself, load state of the ancestor, and load state of the descendant. If finding a node device (for example, N4) whose load is even lighter, N3 forwards the service request to N4. Ultimately, the service request is forwarded to the node device whose load is the lightest in the whole autonomous loop. After receiving the service request forwarded by N3, N4 detects the load state of itself, load state of the ancestor, and load state of the descendant. If finding that the load of itself is the lightest, N4 works together with the initiator A1 to process services normally.

In this scenario, each node device needs to grasp the load state of adjacent node devices, and forward services to the node device whose load is the lightest in the pool in a relay mode, accomplishing load balance in the pool area. Because the load state of the node device is sent to an ancestor node device and a descendant node device without being broadcast in the pool area, the bandwidth resources are conserved.

Scenario 3: real-time backup of services.

Figure 5:
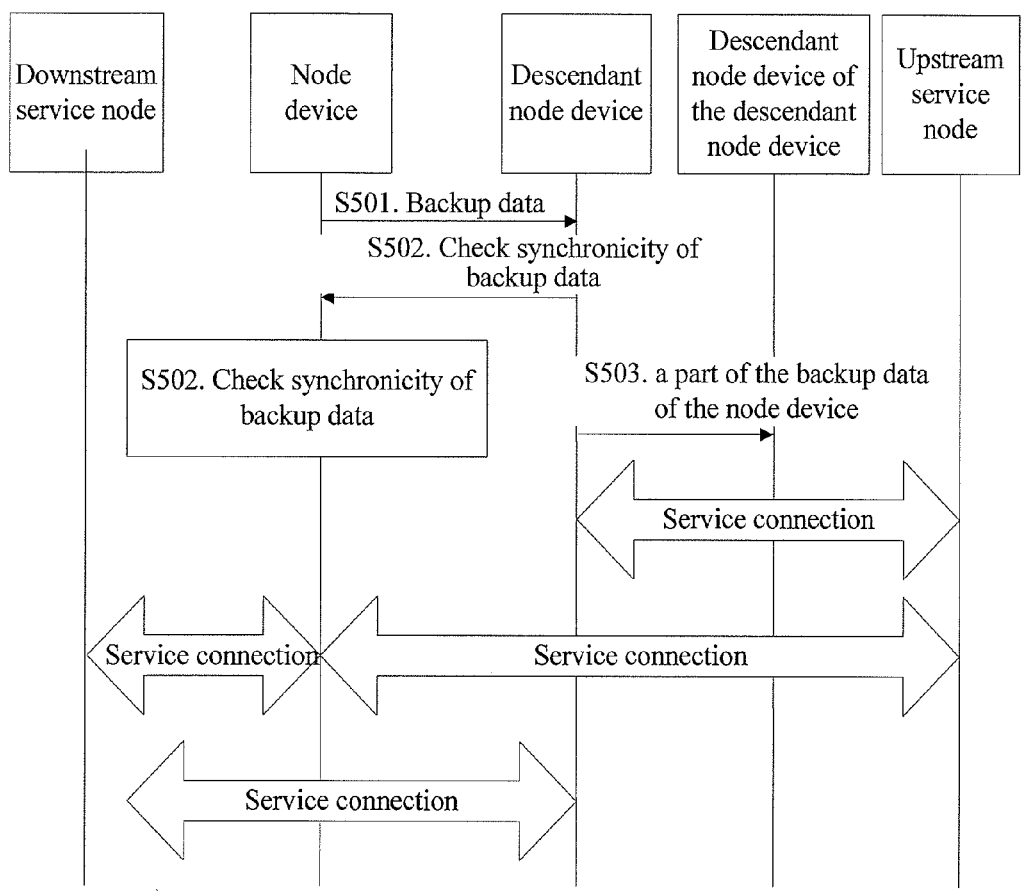
FIG. 5 is a flow chart of a device pool management method provided in Embodiment 4 of the present invention.

FIG. 5 is a flow chart of a device pool management method provided in Embodiment 4 of the present invention. The method includes the following steps:

S501: A node device in the Pool-style autonomous loop sends the data of itself to be backed up to a descendant node device for backup. For example, N2 sends user information, upstream and downstream service node connection information, service bearer contexts, and other important service-related information to the descendant node device N3 for backup in real time. The message that carries the service contexts is Pool_Data_Backup, and the parameters carried in the message are: "number of contexts to be backed up", and "list of contexts to be backed up". Each context to be backed up in the list includes the parameter entries to be updated and the update mode (such as add, delete, and modify).

S502: The node device in the Pool-style autonomous loop receives a request for detecting backup data synchronicity from the descendant node device periodically, and detects synchronicity of the data already backed up. For example, N2 receives the request for detecting backup data synchronicity from N3 periodically, so as to ensure consistency of backup information.

S503: When the capacity of N3 is not sufficient for storing all backup data of N2, some of the backup data of N2 may be sent to the descendant node device of N3 (namely, N4) for storage. To keep the single-link structure of the autonomous loop, N2 and N4 are required to be invisible to each other. That is, N2 does not care whether the backup on N3 is stored locally or remotely, and N4 considers that all backup data comes from N3 solely. The data of N2 that needs to be backed up to N4 is checked and forwarded by N3.

In this embodiment, the upstream and downstream service nodes consider that a "hot backup" relation exists between the serving node device of the current service and the descendant node device of the serving node device. Two active links are connected to the serving node device of the current service and the descendant node device respectively. When the upstream and downstream service nodes detect that the serving node device of the current service fails, the descendant node device of the serving node device of the current service takes over the service interaction.

In this scenario, the service data is backed up once in the pool, but not backed up on all node devices repeatedly, and the seamless switching capability of hot backup and the flexibility of selecting the access point are ensured.

Scenario 4: A node device quits the service initiatively.

Figure 6:
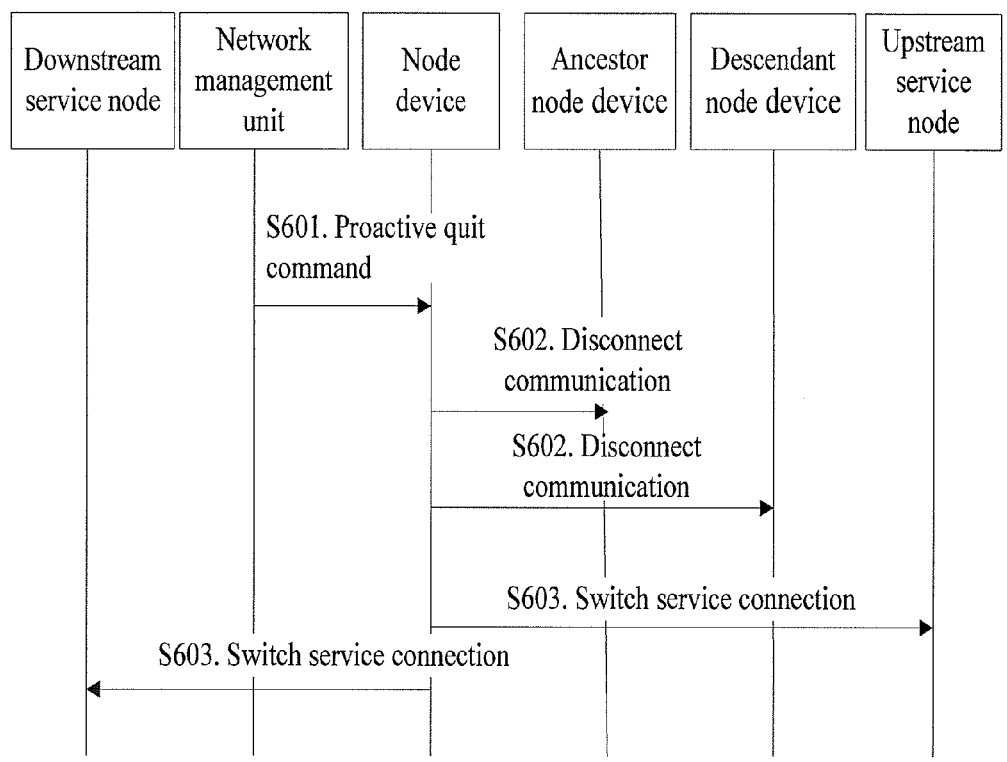
FIG. 6 is a flow chart of a device pool management method provided in embodiment 5 of the present invention.

FIG. 6 is a flow chart of a device pool management method provided in Embodiment 5 of the present invention. The method includes the following steps:

S601: A node device in the Pool-style autonomous loop receives an active quit command sent by a network management unit. The active quit may be caused by upgrade, increase or decrease of capacity, or isolated repair.

S602: The node device in the Pool-style autonomous loop triggers the ancestor node device and the descendant node device to modify the relations between a node device and its ancestor node device and between the node device and its descendant node device in the autonomous loop. For example, N2 sends a Pool_P2P disconnection request to N3 and N1, and sends a Pool_P2P disconnection request to the descendant node device. The request indicates that N2 is about to quit the service, and requires N3 and N1 to modify relations between a node device and its ancestor node device and between the node device and its descendant node device. In this embodiment, after receiving the request from N2, N3 starts an operation of taking over services of N2, and allocates the resources required for running the services of N2. Meanwhile, upon receiving the request from N2, N1 stops sending backup data to N2, starts setting up the relation originally with its ancestor node device and descendant node device with N3, and sets up a backup relation.

S603: The node device in the Pool-style autonomous loop triggers the upstream service node and the downstream service node connected with the node device and located outside the autonomous loop to switch services over to the descendant node device. For example, N2 sends a message to the upstream service node and the downstream service node as an instruction of switching services over to the descendant node device N3.

In this embodiment, while N3 takes over the services of N2, if the service goes beyond the maximum capacity of N3, namely, N3 is overloaded, N3 may initiate a load migration procedure so that the part beyond the capacity is transferred to the descendant node device (or the node device whose load is lighter).

In this embodiment, the quit of a node device leads to a short period of load imbalance in the pool area, and makes the adjacent node device bear greater load. The surplus load is migrated to remote node devices along the autonomous loop, and the load will be balanced again in the pool area.

In this embodiment, after the node device quits the autonomous loop, the autonomous loop updates management parameters, for example, decreases the node device quantity of the autonomous loop by 1, and changes the order between node devices in the autonomous loop.

In this scenario, the quit of any node device does not lead to interruption of services running on this node device. The load of the node device that has quit the autonomous loop is transferred to other node devices along the autonomous loop, and the balance in the pool area is balanced again.

Scenario 5: A node device quits the service passively.

Figure 7:
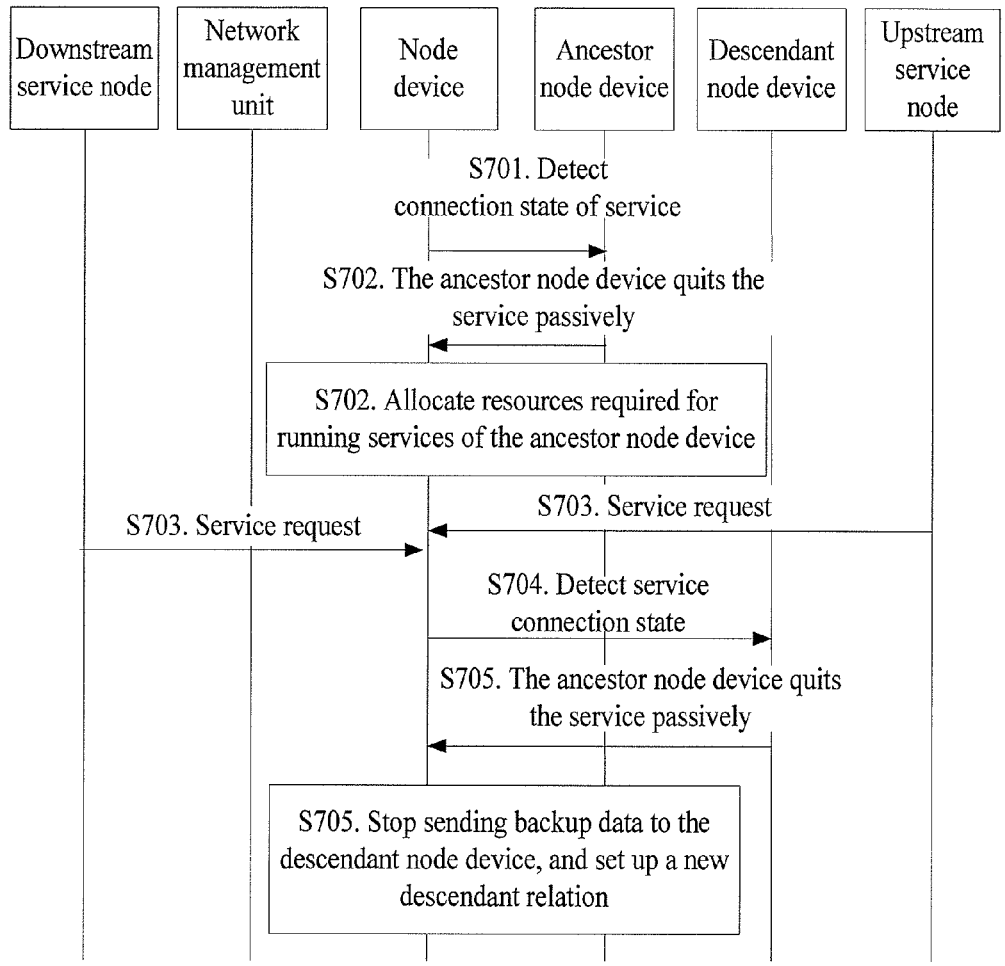
FIG. 7 is a flow chart of a device pool management method provided in Embodiment 6 of the present invention.

FIG. 7 is a flow chart of a device pool management method provided in Embodiment 6 of the present invention. The method includes the following steps:

S701: A node device in the Pool-style autonomous loop detects the service connection state of an ancestor node device of the node device.

S702: After detecting that the ancestor node device quits the service passively, the node device in the Pool-style autonomous loop allocates resources required for running services of the ancestor node device, and sets up a new ancestor relation according to the stored autonomous loop information before entering step S704. For example, if N3 receives no data from N2 or receives no response to the data sent to N2 within a preset period, N3 considers that N2 has quit the service passively, and starts an operation of taking over services of N2 and allocates the resources required for running the services of N2.

S703: The node device in the Pool-style autonomous loop receives a service request from the upstream service node and the downstream service node that perform service interaction with the ancestor node device. The upstream service node and the downstream service node have service connections with the node device on the autonomous loop and can perform uplink and downlink service transmission. For example, the upstream service node of the MME is an eNB, and the downstream service node of the MME is an SGW.

S704: The node device in the Pool-style autonomous loop detects the service connection state of the ancestor node device of the node device.

S705: Upon detecting that the descendant node device quits the service passively, the node device in the Pool-style autonomous loop stops sending backup data to the descendant node device, and sets up a new descendant relation according to the stored autonomous loop information.

In this embodiment, the node device N3 should reserve sufficient capacity for taking over the services of N2 so as to ensure that the services are not interrupted when N2 fails. If the processing resources of N3 become deficient for such reasons, N3 may take over the services and then migrate the services to other node devices. If N3 is overloaded when taking over the services of N2, N3 may initiate a load migration procedure so that the part beyond the capacity is transferred to the descendant node device (or the node device whose load is lighter).

In this embodiment, after the ancestor node device or the descendant node device of the node device quits the autonomous loop passively, the autonomous loop updates management parameters, for example, decreases the node device quantity on the autonomous loop by 1, and changes the relations between each node device and its ancestor node device and descendant node device in the autonomous loop.

In this scenario, a fault of a node device can be detected by the upstream node, the downstream node, and the adjacent node devices in the autonomous loop simultaneously, and the fault triggers the service switching immediately. A predetermined backup relation exists between a node device in the autonomous loop and the descendant node device. Therefore, the upstream service node and the downstream service node can switch the services over to the descendant node device correctly, and the services are recovered quickly.

Scenario 6: overload control.

Figure 8:
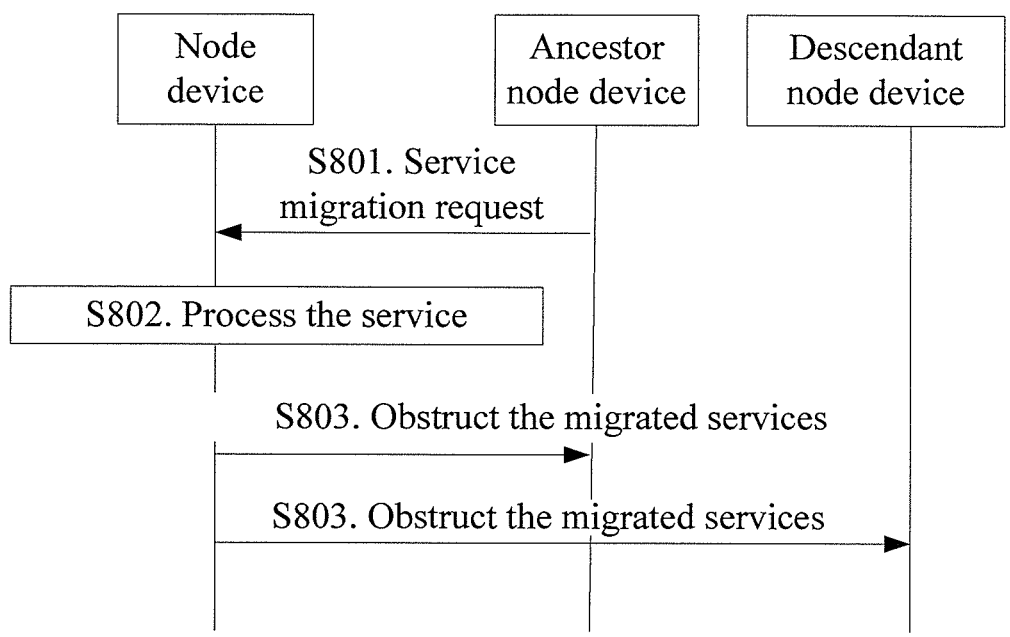
FIG. 8 is a flow chart of a device pool management method provided in Embodiment 7 of the present invention.

FIG. 8 is a flow chart of a device pool management method provided in Embodiment 7 of the present invention. The method includes the following steps:

S801: A node device in a Pool-style autonomous loop receives a service migration request from an ancestor node device.

S802: If accepting services migrated from the ancestor node device according to the load state of the node device, the node device in the Pool-style autonomous loop processes the services.

S803: If rejecting the services migrated from the ancestor node device according to the load state of the node device, the node device in the Pool-style autonomous loop sends a message of obstructing the migrated services to the ancestor node device or forwards the service migration request to the descendant node device.

In this embodiment, after the node device accepts the services migrated from the ancestor node device, the ancestor node device clears the services which have been migrated out.

In this embodiment, if none of the node devices in the pool area accepts the migrated services (all node devices are overloaded), the service migration fails.

In this embodiment, when planning the pool, the network management unit configures the backup relations between the node devices in the autonomous loop according to the capacity or processing capability of each node device in the autonomous loop and the node devices adjacent to this node device.

In this scenario, the overload pressure is shared by all node devices in the pool area under the overload control, reducing services discarded for the purpose of traffic control.

Persons of ordinary skill in the art understand that all or part of the steps in the embodiments of the present invention may be implemented by a program instructing relevant hardware. The program may be stored in a computer readable storage medium.

The storage medium may be a magnetic disk, CD-ROM, Read-Only Memory (ROM), or Random Access Memory (RAM).

Corresponding to the methods described above, the following expounds an apparatus and a system provided in the embodiments of the present invention.

Figure 9:
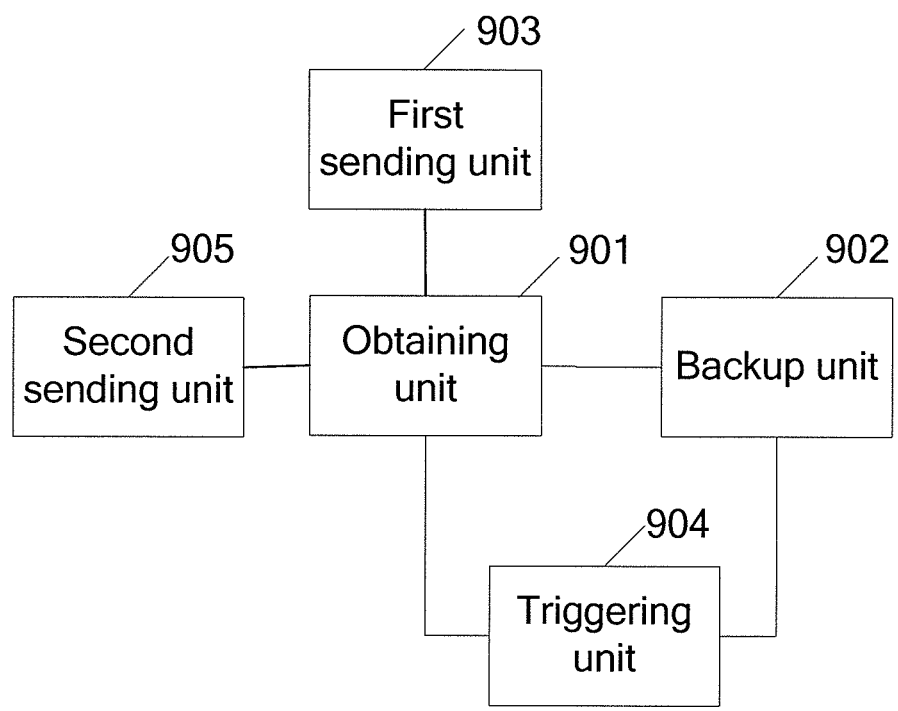
FIG. 9 shows a node device provided in Embodiment 8 of the present invention.

FIG. 9 shows a schematic diagram of a node device provided in Embodiment 8 of the present invention. The node device includes:

an obtaining unit 901, configured to obtain autonomous loop configuration data which describes relations between a node device and its ancestor node device and between the node device and its descendant node device in an autonomous loop by using identifiers of node devices in the autonomous loop;

a backup unit 902, configured to: set up a backup relation between the node device and an ancestor node device as well as a backup relation between the node device and a descendant node device according to the autonomous loop configuration data obtained by the obtaining unit 901; more specifically, obtain the IP address of the ancestor node device according to the autonomous loop configuration data, set up a control channel between the node device and the ancestor node device through a P2P interface, and set up a service channel between the node device and the ancestor node device through the control channel; transmit the control signaling through the control channel, and transmit the service-related data such as backup data and load state information through the service channel; and receive and store the backup data sent by the ancestor node device; and a first sending unit 903, configured to set up a communication connection with the descendant node device and send the data of the node device to be backed up to the descendant node device according to the autonomous loop configuration data obtained by the obtaining unit 901; more specifically, obtain the IP address of the descendant node device according to the autonomous loop configuration data; set up a control channel between the node device and the descendant node device through a P2P interface; set up a service channel between the node device and the descendant node device through the control channel; and transmit the control signaling through the control channel, and transmit the service-related data such as backup data and load state information through the service channel.

In this embodiment, the identifier of each node device is unique in the autonomous loop, and the node device further includes:

a triggering unit 904, configured to: update the autonomous loop configuration data obtained by the obtaining unit 901 when the ancestor node device disengages from the autonomous loop, and trigger an operation of allocating resources required for running services of the ancestor node device according to the backup data stored by the backup unit 902; and a second sending unit 905, configured to update the autonomous loop configuration data obtained by the obtaining unit 901 when the descendant node device disengages from the autonomous loop, and send the data of the node device to be backed up to a newly determined descendant node device.

In this embodiment, after the obtaining unit 901 obtains the autonomous loop configuration data, the backup unit 902 stores the backup data of the ancestor node device according to the autonomous loop configuration data, and the first sending unit 903 sends the data of the node device to be backed up to the descendant node device. Therefore, when the ancestor node device in the autonomous loop fails and needs to disengage from the autonomous loop, the triggering unit 904 allocates the resources required for running the corresponding services to prevent service interruption. When the descendant node device in the autonomous node disengages from the autonomous loop, the second sending unit 905 sends the data to be backed up to the newly determined descendant node device so that the newly determined descendant node device is capable of taking over services of the node device disengaged from the autonomous loop.

Embodiment 9

On the basis of the Embodiment 8, the node device in this embodiment may further include:

a configuring unit, configured to receive configuration data, configure the node device according to the configuration data, and obtain autonomous loop configuration data, where the configuration data includes: an identifier of the node device in the pool area, sequence numbers of the ancestor node device and the descendant node device of the node device in the autonomous loop, load bearing capacities of the node device, the ancestor node device, and the descendant node device, and management parameters of the autonomous loop;

a first connecting unit, configured to set up a connection to the ancestor node device according to the autonomous loop configuration data obtained by the configuring unit, for example, if the autonomous loop configuration data indicates that an identifier of the node device is N3 and an identifier of the ancestor node device is N2, connect the node device N3 with the ancestor node device N2 through a first pool-P2P interface; and more specifically, obtain the IP address of the ancestor node device according to the autonomous loop configuration data, set up a control channel between the node device and the ancestor node device through the P2P interface, set up a service channel between the node device and the ancestor node device through the control channel, transmit the control signaling through the control channel, and transmit the service-related data such as backup data and load state information through the service channel; and a second connecting unit, configured to set up a connection to the descendant node device according to the configuration data obtained by the configuring unit, for example, if the autonomous loop configuration data indicates that the identifier of the node device is N3 and that the descendant node device is N4, connect the node device N3 with the descendant node device N4 through a second pool-P2P interface; more specifically, obtain the IP address of the descendant node device according to the autonomous loop configuration data, set up a control channel between the node device and the descendant node device through the P2P interface, set up a service channel between the node device and the descendant node device through the control channel, transmit the control signaling through the control channel, and transmit the service-related data such as backup data and load state information through the service channel.

Embodiment 10

On the basis of the Embodiment 8, the obtaining unit in this embodiment is a first obtaining unit, which is configured to obtain configuration data indicative of changes of the ancestor node device, for example, obtain the configuration data of N2 if the ancestor node device changes from N3 to N2; and, accordingly, the backup unit is an updated data backup unit, which is configured to receive and store the backup data sent by a changed ancestor node device.

Embodiment 11

On the basis of Embodiment 8, the obtaining unit in this embodiment is a second obtaining unit, which is configured to obtain configuration data indicative of changes of the descendant node device; and, accordingly, the backup unit is an updated data sending unit, which is configured to send the data of the node device to be backed up to the updated descendant node device.

Embodiment 12

On the basis of the Embodiment 8, the node device in this embodiment further includes:

a load state receiving unit, configured to receive and store load state information of the ancestor node device and the descendant node device of the node device according to the autonomous loop configuration data obtained by the obtaining unit; and a load state sending unit, configured to send the load state information of the node device to the ancestor node device and the descendant node device according to the autonomous loop configuration data obtained by the obtaining unit.

Embodiment 13

On the basis of any of Embodiments 8-12, the node device in this embodiment further includes:

a load state detecting unit, configured to detect whether any service data is received from a downstream service node located outside the autonomous loop and connected with the node device; and, if service data is received from the downstream service node located outside the autonomous loop and connected with the node device, detect the load state of the node device, load state of the ancestor node device, and load state of the descendant node device according to the autonomous loop configuration data obtained by the obtaining unit;

a service processing unit, configured to process the received service data if the load state detecting unit detects that the load of the node device is the lightest; and a forwarding unit, configured to: forward the service data to the lightest-loaded node device through the connection created by the first connecting unit and directed to the ancestor node device, or forward the service data to the lightest-loaded node device through the connection created by the second connecting unit and directed to the descendant node device, if the load state detecting unit detects that the load of the ancestor node device or the descendant node device is the lightest.

Embodiment 14

On the basis of any of Embodiments 8-12, the node device in this embodiment further includes:

an overload detecting unit, configured to detect the load state information of the node device and judges whether the node device is overloaded; and, if the node device is overloaded, migrate a part of services beyond processing capacity of the node device to the descendant node device, and send service migration information; and a clearing unit, configured to clear migrated services upon receiving the service migration information from the overload detecting unit.

Embodiment 15

On the basis of any of embodiments 8-12, the node device in this embodiment further includes:

a quit command detecting unit, configured to: detect whether any active quit command is received from the network management unit; if an active quit command is received from the network management unit, use the connection created by the first connecting unit and directed to the ancestor node device to trigger the ancestor node device to modify the relations between the ancestor node device and its ancestor node device and descendant node device, and use the connection created by the second connecting unit and directed to the descendant node device to trigger the descendant node device to modify the relations between the descendant node device and its ancestor node device and descendant node device; and a service switching triggering unit, configured to trigger the upstream service node and the downstream service node connected with the node device to switch services over to the descendant node device respectively according to the active quit command and the autonomous loop configuration data obtained by the obtaining unit.

Embodiment 16

On the basis of any of Embodiments 8-12, the node device in this embodiment further includes:

a service migration request receiving unit, configured to receive a service migration request from the ancestor node device according to the autonomous loop configuration data obtained by the obtaining unit;

a service processing unit, configured to process services migrated out by the ancestor node device if accepting the migrated services according to the service migration request and the load state of the node device; and an obstructing unit, configured to send a message of obstructing the services to the ancestor node device or forward the service migration request to the descendant node device if rejecting the services migrated out by the ancestor node device according to the service migration request and the load state of the node device.

Embodiment 17

Figure 10:
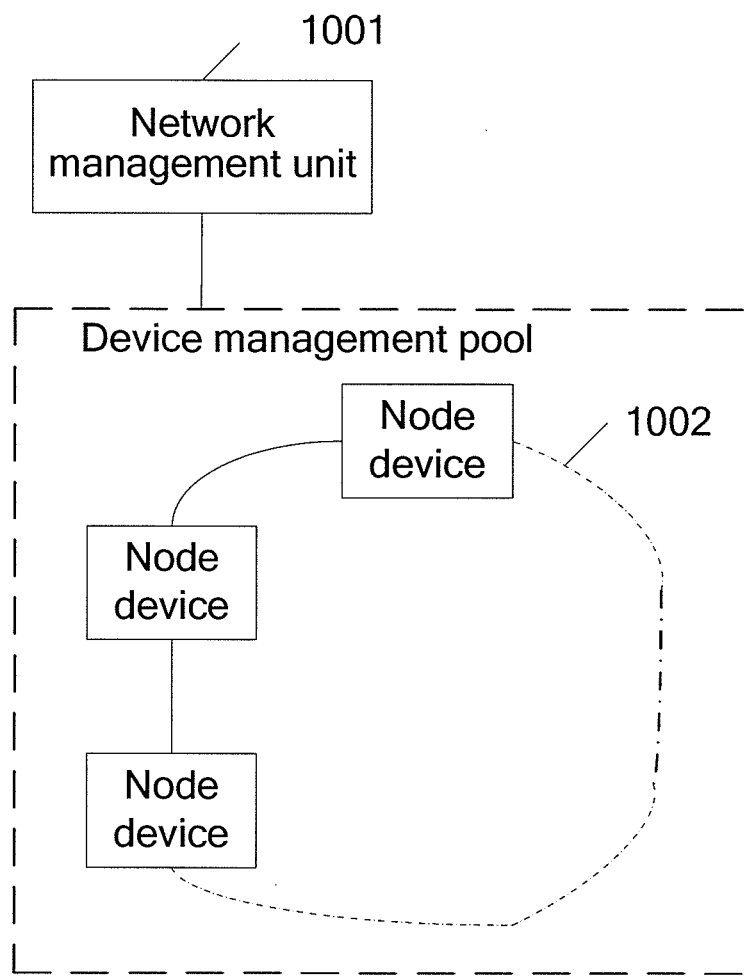
FIG. 10 shows a communication system provided in Embodiment 17 of the present invention.

FIG. 10 shows a communication system provided in Embodiment 17 of the present invention. The communication system in this embodiment includes a network management unit 1001, and an autonomous loop 1002 including a plurality of node devices. The autonomous loop 1002 is a closed loop, and each node device has an identifier in the autonomous loop.

The network management unit 1001 is configured to send autonomous loop configuration data to each node device in the autonomous loop, where the autonomous loop configuration data describes relations between a node device and its ancestor node device and between the node device and its descendant node device in the autonomous loop by using identifiers of node devices in the autonomous loop. For example, the configuration data includes: an identifier of the node device in the pool area, sequence numbers of the ancestor node device and the descendant node device in the autonomous loop, load bearing capacities of the node device, the ancestor node device, and the descendant node device, and management parameters of the autonomous loop.

The node device is configured to: obtain the autonomous loop configuration data which describes relations between a node device and its ancestor node device and between the node device and its descendant node device in the autonomous loop by using identifiers of node devices in the autonomous loop; set up a backup relation between the node device and an ancestor node device as well as a backup relation between the node device and a descendant node device according to the autonomous loop configuration data, receive and store backup data sent by the ancestor node device, and send data of itself to be backed up to the descendant node device.

The identifier of each node device is unique in the autonomous loop. The system further includes:

a triggering unit, configured to: update the autonomous loop configuration data obtained by the obtaining unit when the ancestor node device disengages from the autonomous loop, and trigger an operation of allocating resources required for running the corresponding services of the ancestor node device according to the backup data stored by the backup unit; and a second sending unit, configured to update the autonomous loop configuration data obtained by the obtaining unit when the descendant node device disengages from the autonomous loop, and send the data of the node device to be backed up to a newly determined descendant node device.

Embodiment 18

On the basis of Embodiment 17 above, the node device in this embodiment is the node device described in Embodiment 9.

Embodiment 19

On the basis of Embodiment 17 above, the node device in this embodiment is the node device described in Embodiment 10.

Embodiment 20

On the basis of Embodiment 17 above, the node device in this embodiment is the node device described in Embodiment 11.

Embodiment 21

On the basis of Embodiment 17 above, the node device in this embodiment is the node device described in Embodiment 12.

Embodiment 22

On the basis of embodiment 21 above, the node device in this embodiment is the node device described in Embodiment 13.

Embodiment 23

On the basis of Embodiment 17 above, the node device in this embodiment is the node device described in Embodiment 14.

Embodiment 24

On the basis of Embodiment 17, the network management unit in this embodiment further includes: a quit command sending unit, configured to send an active quit command to the node device.

The node device in this embodiment is the node device described in Embodiment 15.

Embodiment 25

On the basis of Embodiment 17 above, the node device in this embodiment is the node device described in Embodiment 16.

The embodiments described above are applicable to all networks that work in the pool mode, including but not limited to: System Architecture Evolution (SAE) core network, Worldwide Interoperability for Microwave Access (WiMAX) core network, and Universal Mobile Telecommunications System (UMTS) core network.

In the foregoing embodiments, a Pool-style autonomous loop is set up between the node devices; relations between a node device and its ancestor node device and descendant node device, a data backup relation, and a load adjustment relation are configured between the node devices in the autonomous loop; when a node device fails, the services of the faulty node device can be switched over to other node devices in time, preventing service loss; the load can be balanced between node devices, which improves network reliability and the autonomous capability of the network.

Expounded above are a method, a node device, and a communication system for device pool management under the present invention. Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A device pool management method, comprising:
obtaining autonomous loop configuration data which describes relations between a node device and its ancestor node device and between the node device and its descendant node device in an autonomous loop by using identifiers of node devices in the autonomous loop; and
setting up a backup relation between a node device and an ancestor node device as well as a backup relation between the node device and a descendant node device according to the autonomous loop configuration data, receiving and storing backup data sent by the ancestor node device, and sending data of the node device to be backed up to the descendant node device;
detecting whether any active quit command is received, and, if an active quit command is received, triggering the ancestor node device and the descendant node device to modify the relations between a node device and its ancestor node device and between the node device and its descendant node device in the autonomous loop; and
triggering an upstream service node and a downstream service node that are connected with the node device and located outside the autonomous loop to switch services over to the descendant node device.

2. The method according to claim 1, wherein: the identifier of each node device is unique in the autonomous loop, and the method further comprises:
when the ancestor node device disengages from the autonomous loop, updating the autonomous loop configuration data, and triggering an operation of allocating resources required for running services of the ancestor node device according to the backup data sent by the ancestor node device; and
when the descendant node device disengages from the autonomous loop, updating the autonomous loop configuration data, and sending the data of the node device to be backed up to a newly determined descendant node device.

3. The method according to claim 1, wherein:
the obtaining of the autonomous loop configuration data is: obtaining configuration data that indicates changes of the ancestor node device, and, accordingly, the receiving and storing of the backup data sent by the ancestor node device comprises:
receiving and storing the backup data sent by a changed ancestor node device; or
the obtaining of the autonomous loop configuration data is: obtaining configuration data that indicates changes of the descendant node device, and, accordingly, the sending of the data of the node device to be backed up to the descendant node device comprises:
sending the data of the node device to be backed up to a changed descendant node device.

4. The method according to claim 1, further comprising:
receiving and storing load state information of the ancestor node device and the descendant node device, and sending load state information of the node device to the ancestor node device and the descendant node device.

5. The method according to claim 1, further comprising:
detecting whether any service data is received, and, if service data is received, detecting load state of the node device, load state of the ancestor node device, and load state of the descendant node device;
processing the received service data if it is detected that a load of the node device is the lightest; or forwarding the service data to the node device whichever bears the lightest load if it is detected that a load on the ancestor node device or the descendant node device is the lightest; or detecting the load state information of the node device to check whether the node device is overloaded, and migrate a part of services beyond processing capacity of the node device to the descendant node device if the node device is overloaded.

6. The method according to claim 1, wherein: the receiving and storing of the backup data sent by the ancestor node device comprises:

receiving the backup data, and storing all the backup data locally; or receiving the backup data, storing backup data that can be borne by the node device locally according to the load state information of the node device, and sending the remaining part of the received backup data to the descendant node device.

7. The method according to claim 1, further comprising:

receiving a service migration request sent by the ancestor node device;

processing services migrated out by the ancestor node device if accepting the migrated services according to the service migration request and the load state of the node device; or sending a message of obstructing the services to the ancestor node device or forwarding the service migration request to the descendant node device if deciding to reject the services migrated out by the ancestor node device according to the service migration request and the load state of the node device.

8. A node device, comprising:

an obtaining unit, configured to obtain autonomous loop configuration data which describes relations between a node device and its ancestor node device and between the node device and its descendant node device in an autonomous loop by using identifiers of node devices in the autonomous loop;

a backup unit, configured to set up a backup relation between the node device and an ancestor node device as well as a backup relation between the node device and a descendant node device according to the autonomous loop configuration data obtained by the obtaining unit, and receive and store backup data sent by the ancestor node device;

a first sending unit, configured to send data of the node device to be backed up to the descendant node device according to the autonomous loop configuration data obtained by the obtaining unit; and a quit command detecting unit, configured to: detect whether any active quit command is received from a network management unit; if an active quit command is received from a network management unit, use the connection created by the first connecting unit and directed to the ancestor node device to trigger the ancestor node device to modify the relations of the ancestor node device between its ancestor node device and descendant node device in the autonomous loop, and use the connection created by the second connecting unit and directed to the descendant node device to trigger the descendant node device to modify the relations of the descendant node device between its ancestor node device and descendant node device in the autonomous loop; and a service switching triggering unit, configured to trigger an upstream service node and a downstream service node connected with the node device to switch services over to the descendant node device according to the active quit command and the autonomous loop configuration data obtained by the obtaining unit.

9. The node device according to claim 8, wherein:

the identifier of each node device is unique in the autonomous loop, and the node device further comprises:

a triggering unit, configured to update the autonomous loop configuration data obtained by the obtaining unit when the ancestor node device disengages from the autonomous loop, and trigger an operation of allocating resources required for running services of the ancestor node device according to the backup data stored by the backup unit; and a second sending unit, configured to update the autonomous loop configuration data obtained by the obtaining unit when the descendant node device disengages from the autonomous loop, and send the data of the node device to be backed up to a newly determined descendant node device.

10. The node device according to claim 8, further comprising:

a configuring unit, configured to receive configuration data, configure the node device according to the configuration data, and obtain the autonomous loop configuration data;

a first connecting unit, configured to use a first Point-to-Point (P2P) interface to set up a connection to the ancestor node device in the autonomous loop according to the autonomous loop configuration data obtained by the configuring unit, wherein the autonomous loop is a closed loop; and a second connecting unit, configured to use a second P2P interface to set up a connection to the descendant node device in the autonomous loop according to the autonomous loop configuration data obtained by the configuring unit.

11. The node device according to claim 9, wherein:

the obtaining unit is a first obtaining unit which is configured to obtain configuration data indicative of changes of the ancestor node device; and, accordingly the backup unit is an updated data backup unit which is configured to receive and store the backup data sent by a changed ancestor node device; or the obtaining unit is a second obtaining unit which is configured to obtain configuration data indicative of changes of the descendant node device; and, accordingly the backup unit is an updated data sending unit which is configured to send the data of the node device to be backed up to a changed descendant node device.

12. The node device according to claim 8, further comprising:

a load state receiving unit, configured to receive and store load state information of the ancestor node device and the descendant node device of the node device according to the autonomous loop configuration data obtained by the obtaining unit; and a load state sending unit, configured to send the load state information of the node device to the ancestor node device and the descendant node device according to the autonomous loop configuration data obtained by the obtaining unit.

13. The node device according to claim 8, further comprising:

a load state detecting unit, configured to detect whether any service data is received from a downstream service node located outside the autonomous loop and connected with the node device; and, if service data is received from the downstream service node located outside the autonomous loop and connected with the node device, detect load state of the node device, load state of the ancestor node device, and load state of the descendant node device according to the autonomous loop configuration data obtained by the obtaining unit;

a service processing unit, configured to process the received service data if the load state detecting unit detects that a load of the node device is the lightest;

a forwarding unit, configured to forward the service data to the node device whichever bears the lightest load if the load state detecting unit detects that the load on the ancestor node device or descendant node device is the lightest;

an overload detecting unit, configured to detect the load state information of the node device and judges whether the node device is overloaded, and, if the node device is overloaded, migrate a part of services beyond processing capacity of the node device to the descendant node device, and send service migration information; and a clearing unit, configured to clear migrated services upon receiving the service migration information from the overload detecting unit.

14. The node device according to claim 8, further comprising:

a service migration request receiving unit, configured to receive a service migration request from the ancestor node device according to the autonomous loop configuration data obtained by the obtaining unit;

a service processing unit, configured to process services migrated out by the ancestor node device if accepting the migrated services according to the service migration request and the load state of the node device; and an obstructing unit, configured to send a message of obstructing the services to the ancestor node device or forward the service migration request to the descendant node device if rejecting the services migrated out by the ancestor node device according to the service migration request and the load state of the node device.

15. A communication system, comprising a network management unit and an autonomous loop comprising a plurality of node devices, wherein:

each node device has an identifier in the autonomous loop;

the network management unit is configured to send autonomous loop configuration data to each node device, wherein the autonomous loop configuration data describes relations between a node device and its ancestor node device and between the node device and its descendant node device in an autonomous loop by using identifiers of node devices in the autonomous loop; and the node device is configured to obtain the autonomous loop configuration data which describes relations between a node device and its ancestor node device and between the node device and its descendant node device in the autonomous loop by using identifiers of node devices in the autonomous loop; set up a backup relation between the node device and an ancestor node device as well as a backup relation between the node device and a descendant node device according to the autonomous loop configuration data, receive and store backup data sent by the ancestor node device, and send data of itself to be backed up to the descendant node device; detect whether any active quit command is received, and, if an active quit command is received, triggering the ancestor node device and the descendant node device to modify the relations between a node device and its ancestor node device and between the node device and its descendant node device in the autonomous loop; and trigger an upstream service node and a downstream service node that are connected with the node device and located outside the autonomous loop to switch services over to the descendant node device.

16. The system according to claim 15, wherein: the identifier of each node device is unique in the autonomous loop, and the node device is further configured to:

update the autonomous loop configuration data obtained by an obtaining unit when the ancestor node device disengages from the autonomous loop, and trigger an operation of allocating resources required for running services of the ancestor node device according to the backup data stored by a backup unit; and update the autonomous loop configuration data obtained by the obtaining unit when the descendant node device disengages from the autonomous loop, and send the data of the node device to be backed up to a newly determined descendant node device.

17. The system according to claim 15, the node device is further configured to:

receive and store load state information of the ancestor node device and the descendant node device of the node device according to the autonomous loop configuration data obtained by the node device;

send load state information of the node device to the ancestor node device and the descendant node device according to the autonomous loop configuration data obtained by the node device;

detect whether any service data is received from a downstream service node located outside the autonomous loop and connected with the node device; and, if service data is received from the downstream service node located outside the autonomous loop and connected with the node device, detect load state of the node device, load state of the ancestor node device, and load state of the descendant node device according to the autonomous loop configuration data obtained by the node device;

process the received service data if the load state detecting unit detects that a load of the node device is the lightest; and forward the service data to the node whichever bears the lightest load if the load state detecting unit detects that a load on the ancestor node device or the descendant node device is the lightest.

18. The system according to claim 15, the node device is further configured to:

receive a service migration request from the ancestor node device according to the autonomous loop configuration data obtained by the node device;

process the services migrated out by the ancestor node device if accepting the migrated services according to the service migration request and the load state of the node device; and send a message of obstructing the services to the ancestor node device or forward the service migration request to the descendant node device if rejecting the services migrated out by the ancestor node device according to the service migration request and the load state of the node device.

* * * * *